(12) United States Patent
Pilling et al.

(10) Patent No.: US 12,366,416 B2
(45) Date of Patent: Jul. 22, 2025

(54) STRUCTURED PACKING BED FOR HIGH PRESSURE MASS TRANSFER AND/OR HEAT EXCHANGE APPLICATIONS

(71) Applicant: SULZER MANAGEMENT AG, Winterthur (CH)

(72) Inventors: Mark Pilling, Jenks, OK (US); Ilja Ausner, Oehningen (DE)

(73) Assignee: SULZER MANAGEMENT AG, Winterthur (CH)

( * ) Notice: Subject to any disclaimer, the term of this patent is extended or adjusted under 35 U.S.C. 154(b) by 380 days.

(21) Appl. No.: 18/014,106

(22) PCT Filed: Jun. 28, 2021

(86) PCT No.: PCT/EP2021/067712
§ 371 (c)(1),
(2) Date: Dec. 30, 2022

(87) PCT Pub. No.: WO2022/002858
PCT Pub. Date: Jan. 6, 2022

(65) Prior Publication Data
US 2023/0358480 A1 Nov. 9, 2023

Related U.S. Application Data

(60) Provisional application No. 63/205,629, filed on Jul. 2, 2020.

(30) Foreign Application Priority Data

Jul. 9, 2020 (EP) .................................... 20185091

(51) Int. Cl.
*F28D 9/00* (2006.01)
*F28D 21/00* (2006.01)
*F28F 3/02* (2006.01)

(52) U.S. Cl.
CPC .......... *F28D 9/0025* (2013.01); *F28D 9/0006* (2013.01); *F28D 21/0015* (2013.01); *F28F 3/025* (2013.01)

(58) Field of Classification Search
CPC .................. F28D 9/0025; F28D 9/0006; B01J 2219/3221; B01J 2219/32217;
(Continued)

(56) References Cited

U.S. PATENT DOCUMENTS

| 5,632,934 A | 5/1997 | Billingham et al. |
| 6,206,349 B1 | 3/2001 | Parten |

(Continued)

FOREIGN PATENT DOCUMENTS

| DE | 1253673 B | 11/1967 |
| EP | 3132848 A1 | 2/2017 |

(Continued)

OTHER PUBLICATIONS

European Search Report issued Dec. 20, 2022 in corresponding European Application No. 20185091.4.
(Continued)

*Primary Examiner* — Steve S Tanenbaum
(74) *Attorney, Agent, or Firm* — Global IP Counselors, LLP

(57) ABSTRACT

A structured packing bed for a column is provided. The structured packing bed comprises at least two layers stacked vertically above each other, and at least two of the layers each comprise at least one structured cross-channel packing element having a specific surface area of 60 to 500 m²/m³ and a height of 50 to less than 150 mm. At least 50% of the structured cross-channel packing elements are a block comprising a plurality of sheets with periodic deformations. The sheets are arranged in a longitudinal direction parallel and in touching contact with each other such that an open space is
(Continued)

provided between them. Adjacent sheets are oriented such that their deformations intersect in crisscross fashion with each other, and a structured cross-channel packing element of a layer is rotated with regard to a structured cross-channel packing element of an adjacent layer by 70 to 110°.

15 Claims, 4 Drawing Sheets

(58) Field of Classification Search
CPC ...... B01J 2219/3222; B01J 2219/32268; B01J 2219/32272; B01J 19/32
USPC .......................................................... 165/166
See application file for complete search history.

(56) References Cited

U.S. PATENT DOCUMENTS

| | | | |
|---|---|---|---|
| 9,694,342 B2* | 7/2017 | Haroun | B01J 19/32 |
| 9,956,540 B1* | 5/2018 | Binkley | B01J 19/32 |
| 10,201,799 B2 | 2/2019 | Kehrer | |
| 10,576,450 B2* | 3/2020 | Fleming | B01J 19/32 |
| 2018/0087834 A1* | 3/2018 | Sunder | F25J 3/04909 |
| 2018/0087835 A1* | 3/2018 | Sunder | B01J 19/32 |

FOREIGN PATENT DOCUMENTS

| | | |
|---|---|---|
| EP | 3299087 A1 | 3/2018 |
| GB | 1004046 A | 9/1965 |

OTHER PUBLICATIONS

International Search Report and Written Opinion issued Sep. 22, 2021 in corresponding International Application No. PCT/EP2021/067712.

Written Opinion of the International Preliminary Examining Authority issued Jun. 2, 2021 in corresponding International Application No. PCT/EP2021/067712.

* cited by examiner

STRUCTURED PACKING BED FOR HIGH PRESSURE MASS TRANSFER AND/OR HEAT EXCHANGE APPLICATIONS

CROSS-REFERENCE TO RELATED APPLICATION

This application is a U.S. National Stage application of PCT/EP2021/067712, filed Jun. 28, 2021, which claims priority to European Application No. 20185091.4, filed Jul. 9, 2020 and U.S. Provisional Application No. 63/205,629, filed Jul. 2, 2020, the contents of each of which are hereby incorporated by reference.

BACKGROUND

Technical Field

The present disclosure relates to a structured packing bed for a column for at least one of mass transfer and heat exchange between a first fluid phase and a second fluid phase, wherein the column is designed for being operated at a pressure of at least 6 bar. Moreover, the present disclosure relates to a column for at least one of mass transfer and heat exchange comprising such a structured packing bed as well as to a method for at least one of mass transfer and heat exchange performed with the column being operated at a pressure of at least 6 bar and preferably of at least 10 bar.

Background Information

Structured packing beds composed of a plurality of structured packing elements are used in mass transfer and/or heat exchange columns, such as fractionation columns, distillation columns, absorption columns, extraction columns or flue gas scrubbers. A structured packing bed comprises several layers stacked vertically above each other, wherein each layer is composed of one or more structured packing elements. The higher the diameter of the structured packing bed, the higher the number of structured packing elements per layer. The structured packings elements serve for the improvement of the mass transfer and/or heat exchange between at least two fluid phases of different densities, wherein the structured packings elements are typically operated in counter-current flow. While in distillation and absorption applications, the light phase is a gas or vapor and the heavy phase is a condensate or liquid, in extraction processes both phases are liquids with different densities. The structured packing elements comprise a plurality of different sheets, each of which provides surface area for the heavier phase that trickles down along the surface of the sheet and spreads. In addition, between the different sheets of the structured packing elements open spaces are provided, which are filled with the light phase (e.g. vapor or gas in distillation) and provide a path for the light phase to ascend, while it is driven by a pressure gradient. The pressure gradient is required to overcome the flow resistance. In the typical case of counter-current flow, the average flow direction of the light phase is from bottom to top of the structured packing element and thus opposite to the average flow direction of the heavy phase. By allowing the one heavy phase to spread on the surface of the structured packing elements, an interface is created between the at least two phases so that an efficient heat and mass transfer between the phases is established at the interface. There may also be applications with more than one heavy phase. An example is extractive distillation.

SUMMARY

A mass transfer column usually comprises several beds of structured packing elements. Typically, a distributor is arranged on top of each bed to evenly distribute the heavy phase over the cross-section of the bed, while leaving enough space for the light phase to ascend through it. Moreover, often a grid-like holding device and a collector are arranged below each bed, wherein the grid-like structure keeps the bed at its position and the collector collects the heavy phase trickling down from the bed, while sufficient open space is left in the collector for the light phase to ascend.

A common type of structured packing elements is the so-called cross-channel corrugated sheet packing, which is assembled from a plurality of corrugated sheets, which are arranged parallel and in touching contact with each other. Typically, the corrugated metal sheets are fixed with each other by means of several rods penetrating the corrugated sheets perpendicular to the longitudinal section of the corrugated sheets, wherein the rods are fixed with the first and last corrugated sheet by means of a washer and a nut or by bending the rod. Each corrugated sheet comprises a plurality of alternately oriented peaks and valleys, wherein adjacent corrugated sheets are oriented such that the corrugations of the adjacent corrugated sheets intersect in crisscross fashion, with the corrugations of the corrugated sheets extending obliquely relative to the vertical or longitudinal direction, thus forming inclined channels which continuously cross one another. These channels positively influence the flows of the gas phase and of the liquid phase within the packing and facilitate the mass and/or heat transfer between the phases. That is, the gas phase and the liquid phase are brought into contact in the channels of the structured packing element and the mass transfer as well as the heat transfer between the phases is thus facilitated. More specifically, ascending gas comes into contact with liquid, which is present on the surface of the sheets forming the channels when it flows downwardly through the mass transfer column. During this contact, a component enriched in the gas can transfer into the liquid and vice versa; this means that an efficient mass transfer can take place. Such packings are described, for example, in DE 1 253 673, in U.S. Pat. No. 6,206,349 BI, in EP 3 299 087 A1 and in U.S. Pat. No. 5,632,934.

The height of commercially available structured cross-channel corrugated sheet packing elements is 180 to 300 mm. EP 3 299 087 A1 describes that usual heights of packing elements are 200 to 300 mm and proposes using higher packing elements with a height of 350 to 400 mm. In U.S. Pat. No. 5,632,934 describes structural packing elements having a height of 6 to 12 inches, i.e. of 152.4 to 304.8 mm.

If necessary, for adjusting the overall height of the structured packing bed or for the purpose of good initial liquid distribution, sometimes the top layer of a structured packing bed is composed of shorter structural packing elements. Even in this case, however, the remaining layers, i.e. usually far more than 90% of all layers, are composed of the standard size structured packing elements with the aforementioned heights of typically between 180 and 300 mm.

Certain mass transfer applications, such as the distillation of volatile materials, require operating the mass transfer column at a comparably high pressure of at least 6 bar or even at least 10 bar. The high pressure for the distillation of volatile materials is necessary, in order to raise their condensation temperature to the desired level or in order to allow condensation of these light hydrocarbons at cost effective temperatures, respectively. Prominent examples of such applications are the separation of light hydrocarbons, such as e.g. methane, ethane, propane and the like found in petroleum sources and natural gas, by distillation. However, structured packing elements can have a lower efficiency in industrial scale columns when they are operated at such a high pressure. It is described in the literature that the reason for the decrement of mass transfer efficiency at higher pressure is an axial liquid backmixing. High pressure applications are typically characterized by low liquid densities and very low surface tensions, but high vapor densities and this combination enables high buoyancy forces which lift small liquid droplets upwards with the vapor phase thus leading to axial backmixing inside the column. On the other hand, the vapor phase is dragged by the downwards falling liquid phase and also suffers some backmixing. It has also been reported that at a certain higher pressure, an inversion-point appears, at which the flow behavior changes drastically resulting in significant changes in pressure drop and separation efficiency. For example, for a distillation of i-butane and n-butane with a column having a structured packing bed composed of commercially available cross-channel corrugated sheet packing elements, such an inversion-point appears at about 10 bar. This behavior is characteristic for structured packing elements, but not for random packings. In random packings, the volume is more open in all three dimensions and neither gas nor liquid phases are trapped. Therefore, local differences in vapor-liquid flows are compensated sooner in random packings, and small liquid droplets dragged with the vapor flow collide sooner with packing material and hence are separated from vapor flow better than in straight corrugated channels of structured packing elements. However, the multiple re-direction of vapor flow within random packings increases the pressure drop significantly.

In view of the above, the object underlying the present disclosure is to provide a structured packing bed for a column for at least one of mass transfer and heat exchange between a first fluid phase and a second fluid phase, w % herein the column is designed to be operated at a pressure of at least 6 bar and preferably of at least 10 bar, which combines the advantages of random packings and structured cross-channel packings, i.e. which has a high mass transfer efficiency even if operated at a pressure above 10 bar like in random packings, but which nevertheless has a comparably low pressure drop like in a structured cross-channel packing.

In accordance with the present disclosure, this object is satisfied by providing a structured packing bed for a column for at least one of mass transfer and heat exchange between a first fluid phase and a second fluid phase, the column being designed to operate at a pressure of at least 6 bar, wherein the structured packing bed comprises at least two layers that are stacked vertically above each other, at least two of the at least two layers each comprising at least one structured cross-channel packing element having a specific surface area of 60 to 500 $m^2/m^3$ and a height of 50 to less than 150 mm, at least 50% of the at least one structured cross-channel packing element being a block, each block comprising a plurality of sheets with periodic deformations, the sheets being arranged in the longitudinal direction parallel and in touching contact with each other such that an open space extending from one end to an opposite end of the sheets is provided between them, the open space being defined by the periodic deformations, adjacent sheets being oriented such that the periodic deformations of the adjacent sheets intersect in crisscross fashion with each other, and at least one of the at least one structured cross-channel packing element of a layer being rotated with regard to at least one of the at least one structured cross-channel packing element of an adjacent layer by 70 to 110°.

This solution is based on the surprising finding that a mass transfer and/or heat exchange column may be operated even at a high pressure of at least 6 bar and even at a high pressure of more than 10 bar, or even more than 15 bar, with a high mass transfer efficiency and a low pressure drop, if it contains one or more structured packing beds composed or at least mainly composed of structured cross-channel packing elements having a specific surface area of 60 to 500 $m^2/m^3$ and a height of 50 to less than 150 mm. Without wishing to be bound to a specific theory, it is considered that by shortening the height of the structured cross-channel packing elements, the aforementioned described backmixing, and in particular axial backmixing, can be significantly reduced, even and in particular if the mass transfer and/or heat exchange column is operated at a pressure of more than 10 bar. This is considered to be due to interrupting or shortening, respectively, the comparably long flow paths within the known structured cross-channel packing elements by reducing the height thereof.

Moreover, the preferred rotation of adjacent structured cross-channel packing elements of adjacent layers by 70 to 110° leads to a particularly good gas distribution in the structured packing bed. All in all, the structured packing bed in accordance with the present disclosure combines the advantages of random packings and those of structured cross-channel packings, i.e. a high mass transfer efficiency even if operated at a pressure above 10 bar and a comparably low pressure drop.

In accordance with the present disclosure, the heights of the at least one structured cross-channel packing element of the at least two layers of the structured packing bed are 50 to 150 mm. If the height is higher than 150 mm, the aforementioned disadvantage of decreased mass transfer efficiency occurs, when the structured packing bed is operated at a high pressure, whereas the mass transfer efficiency also decreases when the height is smaller than 50 mm, because then the length of the fluid paths within the structured cross-channel packing elements is too short. Good results are in particular obtained, when the height of the at least one structured cross-channel packing element is 50 to less than 150 mm, more preferably 50 to 145 mm, yet more preferably 50 to 140 mm, still more preferably 60 to 130 mm, even more preferably 70 to 120 mm and most preferably 75 to 110 mm.

Furthermore, in accordance with the present disclosure, the specific surface areas of the at least one structured cross-channel packing element of the at least two layers of the structured packing bed are 60 to 500 $m^2/m^3$. If the specific surface area is higher than 500 $m^2/m^3$, the structured packing bed composed of the structured cross-channel packing elements is not suitable for high pressure applications. This is due to the fact that packings with such a high specific surface area have small corrugated channels. In high pressure distillation, the liquid rates are relatively high so liquid has difficulty traveling through these smaller channels without bridging the channel cross section. However, when liquid bridges that cross section, no upward vapor flow is allowed, so liquid will travel down one section and vapor will be forced to flow up another section. For this reason, the separated vapor and liquid flows will drastically decrease efficiency in such structured cross-channel packing elements with such a high specific surface area during high pressure distillation. Therefore, structured cross-channel packing elements with a specific surface area of 60 to 500 $m^2/m^3$ cannot be compared with those having a specific surface area of say more than 600 m²/m³, because the latter are designed exclusively for use in low pressure and in particular in cryogenic distillation applications, such as for example the cryogenic distillation of air. Distillation columns for this application are built within a cold box with limited dimensions, such as limited column size and in particular limited column height, because column height is a critical dimension in such an application that needs to be minimized. On account of these reasons, such columns require structured packing beds made of structured packing elements having a high specific surface area so as to decrease the height of the structured packing bed and to get some nominal improvement in efficiency. Good results are in particular obtained, when the specific surface area of the at least one structured cross-channel packing element is 60 to less than 5(0) m²/m³, preferably 100 to less than 500 m²/m³, more preferably 100 to 400 m²/m³, even more preferably 200 to 400 m²/m³ and most preferably 250 to 350 m²/m³.

The specific surface area is defined in the present disclosure as the geometrical area of the structured cross-channel packing element divided by the volume that the structured cross-channel packing element occupies. The geometrical area of the structured cross-channel packing element is the sum of the geometrical area of all sheets comprised in the structured cross-channel packing element, wherein the geometrical area of a sheet adds up both sides of the sheet.

Each layer of the structured packing bed may comprise one or more structured cross-channel packing elements, wherein in tendency the number of structured cross-channel packing elements per layer is higher, the higher the diameter of the structured packing bed. In order to have the same performance over the whole cross-section of each layer, it is suggested in a further development of the idea of the present disclosure that each layer is homogenous over its cross-section. In view thereof, it is preferred that, if one or more of the layers of the structured packing bed comprise more than one structured cross-channel packing element, all structured cross-channel packing elements of a layer have essentially the same height and more preferably the same height.

The present disclosure is particularly suitable for structured packing beds and mass transfer and/or heat exchange columns having a large cross-sectional area. Therefore, it is preferred that the structured packing bed according to the present disclosure has an at least essentially circular cross-sectional shape and that the diameter of the structured packing bed is at least 400 mm, preferably at least 600 mm, even more preferably at least 800 mm, yet more preferably at least 1 m, still more preferably at least 1.5 m, and most preferably at least 2 m. It is further preferred that the diameter of the structured packing bed is at most 15 m, more preferably at most 12 m, and even more preferably at most 6 m. Good results are for instance obtained when the diameter of the structured packing bed is 1.5 to 12 m or 1.5 to 6 m.

If the structured packing bed according to the present disclosure has a different cross-sectional shape than an at least essentially circular, such as a rectangular or oval cross-sectional shape, then it is preferred that the longest dimension of the cross-section of the structured packing is at least 400 mm, preferably at least 600 mm, even more preferably at least 800 mm, yet more preferably at least 1 m, still more preferably at least 1.5 m, and most preferably at least 2 m. It is further preferred that the longest dimension of the structured packing bed is at most 15 m, more preferably at most 12 m, and even more preferably at most 6 m. Good results are for instance obtained when the longest dimension of the structured packing bed is 1.5 to 12 m or 1.5 to 6 m.

In accordance with the present disclosure, at least two layers of the structured packing bed each comprise at least one structured cross-channel packing element having a specific surface area of 60 to 500 m²/m³ and a height of 50 to less than 150 mm. However, if any of these at least two layers comprise more than one structured cross-channel packing element, it is preferred that all structured cross-channel packing elements of the layer have essentially the same specific surface area and more preferably the same specific surface area. Essentially the same specific surface area means in this disclosure that each structured cross-channel packing element of the layer has a specific surface area of 80 to 120%, preferably 90 to 110%, more preferably of 95 to 105%, and even more preferably of 98 to 102%, of the average specific surface area of all structured packing cross-channel elements of the layer. The average specific surface area of all structured cross-channel packing elements of a layer is determined by summing up the specific surface areas of all structured cross-channel packing elements of the layer and dividing the sum by the number of the structured cross-channel packing elements of the layer.

In principle, each of the at least two layers of the structured packing bed may comprise in addition to the one or more structured cross-channel packing elements one or more other structured packing elements. However, it is preferred that a layer and preferably all layers of the structured packing bed only comprise structured cross-channel packing elements.

In accordance with a further preferred embodiment of the present disclosure, the structured packing bed comprises 2 to 30 layers, more preferably 8 to 25 layers, and most preferably 12 to 20 layers, each of which comprises or is composed of one or more structured cross-channel packing elements. Best results are obtained, when each of the layers is composed only of structured cross-channel packing elements and in particular only of structured cross-channel packing elements having a specific surface area of 60 to 500 m²/m³ and a height of 50 to less than 150 mm. However, for adjusting the overall height of the structured packing bed, it might be contemplated to include into the structured packing bed one layer, in particular a top layer, which is composed of structured cross-channel packing elements having a different height or even of structured packing elements having no cross-channel packing elements. Moreover, it might be contemplated to include into the structured packing bed one or more intermediate layers composed of structured packing elements that are not cross-channel packing elements or of structured cross-channel packing elements having a different height than 50 to less than 150 mm, if the total number of layers of the structured packing bed is high enough. In view of this, it is preferred that at least 50%, more preferably at least 75%, still more preferably at least 90%, even more preferably at least 95%, and most preferably all, of the layers of the structured bed comprise at least one structured cross-channel packing element having a specific surface area of 60 to 500 m²/m³ and a height of 50 to less than 150 mm. For all those layers, which comprise more than one structured cross-channel packing element, it is preferred that all structured cross-channel packing elements of the layer have these characteristics and that the layers do not include any structured packing element that is not a structured cross-channel packing element.

As set out above, preferably at least 50% of all structured cross-channel packing elements (and thus preferably of those having a specific surface area of 60 to 500 m²/m³ and a height of 50 to less than 150 mm) used in accordance with the present disclosure are blocks, each block comprising a plurality of sheets with periodic deformations, the sheets being arranged in the longitudinal direction parallel and in touching contact with each other such that an open space extending from one end to an opposite end of the sheets is provided between them, the open space being defined by the periodic deformations, and adjacent sheets being oriented such that the periodic deformations of the adjacent sheets intersect in crisscross fashion with each other. In order to obtain the effects of the present disclosure in a sufficiently high manner, it is preferred that at least 75%, more preferably at least 90%, even more preferably at least 95%, and most preferably all, of the structured cross-channel packing elements are such blocks. The longitudinal direction of the structured cross-channel packing element is the average direction of the structured cross-channel packing element, in which during its operation, such as its operation in a column for mass transfer and/or heat exchange, such as in a distillation column, the light phase ascends and the heavy phase descends. Although the light phase may be divided due to the interaction with the shape of the structured cross-channel packing element into several streams having entirely different orientations, the average direction of the light phase coincides with the longitudinal direction, which is usually the vertical direction or at least close to the vertical direction.

Since the stability of structured cross-channel packing elements is mainly related to crossing points between adjacent sheets, the cross-channels should have at least two crossing points along their length.

In a further development of the idea of the present disclosure, it is proposed that in the aforementioned embodiment, the periodic deformations are corrugations comprising a plurality of alternately oriented peaks and valleys. The corrugations may have a square, a triangular, a sinusoidal or a meander-type cross-section. Preferably, the corrugations have a sinusoidal cross-section. Accordingly, it is preferred that at least 50%, preferably at least 75%, more preferably at least 90%, even more preferably at least 95%, and most preferably all, of the structured cross-channel packing elements are blocks, wherein each block comprises a plurality of sheets with a plurality of alternately oriented peaks and valleys, wherein the peaks of a sheet contact the valleys of an adjacent sheet and the valleys of a sheet contact the peaks of an adjacent sheet, and wherein adjacent sheets are oriented such that the peaks and valleys of the adjacent sheets intersect in crisscross fashion with the peaks and valleys of the sheets preferably extending obliquely relative to the longitudinal direction of the structured cross-channel packing element.

Good results are in particular obtained in this embodiment, when the angle α between each of the peaks and each of the valleys of a structured cross-channel packing element with respect to the longitudinal direction is 10° to 60°, preferably 20° to 50° and most preferably 25° to 47°, wherein the peaks and valleys of adjacent sheets are preferably oriented in opposing directions. This allows a uniform distribution of the light phase over at least one direction of the cross-section of the structured cross-channel packing element. The angles should not be too large to minimize pressure drop and maximize capacity.

In order to reduce the pressure loss of the structured cross-channel packing element, it is proposed in a further development of the idea of the present disclosure that the peaks and valleys of the structured cross-channel packing element are bent in the terminal zones of the corrugated sheets in relation to the peaks and valleys of the central zone being arranged between the terminal zones so that the flow resistance in the terminal zones of the structured cross-channel packing element is reduced with respect to that of the zone arranged between the terminal zones. Accordingly, the peaks and valleys of the corrugated sheets of the structured cross-channel packing element of this embodiment do not extend linearly. Preferably, the peaks and valleys are bent in the terminal zones of the corrugated sheets so as to extend at least essentially vertically. Essentially vertically means that the peaks and valleys are inclined at the lower and upper edges of the sheets by less than angle α, preferably by not more than 10°; more preferably not more than 5° and even more preferably not more than 2° to the vertical direction or longitudinal direction of the structured cross-channel packing element, respectively. The terminal zones are the uppermost and the lowermost zones of the corrugated sheets extending from the upper and lower edges of the sheets 30%, preferably 25% and more preferably 20% or less along the length of the corrugated sheet, which is the direction along the longitudinal direction of the corrugated sheet. Each of the terminal zones may have peaks and valleys with a different height than those of the central zone, which is the zone of the sheet between the two terminal zones. Instead of providing such bends or different heights in both terminal zones, they may only be present in one of the terminal zones.

In order to achieve a very good gas distribution in the structured packing bed, preferably at least one of the structured cross-channel packing element(s) of a layer is rotated with regard to at least one of the structured cross-channel packing element(s) of an adjacent layer by 70 to 110°. This means that the parallel sheets of one of the respective structured cross-channel packing elements are, as seen in the cross-sectional plane, twisted or rotated, respectively, by 70 to 110° to the parallel sheets of the respective structured cross-channel packing elements of an adjacent layer. Preferably, the at least one of the structured cross-channel packing element(s) of a layer is rotated by 70 to 110° with regard to at least one of the structured cross-channel packing element(s) of an adjacent layer arranged above or below the structured cross-channel packing element. More preferably, at least 50% of all structured cross-channel packing elements (and thus preferably of those having a specific surface area of 60 to 500 m²/m³ and a height of 50 to less than 150 mm) of a layer and preferably of each layer are rotated by 70 to 110° with regard to an adjacent structured cross-channel packing element of an adjacent layer of the structured packing bed. Even more preferably at least 75%, yet more preferably at least 90%, still more preferably at least 95%, and most preferably 100%, of all structured cross-channel packing elements of a layer and preferably of each layer are rotated by 70 to 110° with regard to an adjacent structured cross-channel packing element of an adjacent layer of the structured packing bed. Good results are in particular achieved, when in the aforementioned embodiments, the respective structured cross-channel packing element(s) are rotated with regard to each other by 80 to 100°, more preferably by 85 to 95° and most preferably by 88 to 92°, such as by 90°.

The sheets of the structured cross-channel packing element may be made of metal, plastic, carbon-reinforced carbon or any other suitable material. Preferably, they are made from metal, such as stainless steel.

Moreover, in certain applications it may be advantageous that the sheets of a structured cross-channel packing element comprise small openings, in order to improve the wettability of the sheets. The present disclosure is not particularly limited concerning the geometry of the openings. Thus, the openings may have a circular, an ellipsoid, a squarish, a rectangular, a rhombic, a quadrilateral, a hexagonal, a trapezoidal, a polygonal or an irregular cross-sectional form.

If present, preferably the hydraulic diameter of at least 50%, preferably of at least 75%, more preferably of at least 80%, still more preferably of at least 90%, yet more preferably of at least 95%, and most preferably of all, of the openings of each of the at least two sheets is 1.25 to 5.0 mm. Even more preferably the hydraulic diameter of at least 50%, preferably of at least 75%, more preferably of at least 80%, still more preferably of at least 90%, yet more preferably of at least 95%, and most preferably of all, of the openings of each of the sheets is 2.0 to 4.0 mm and most preferably 2.2 to 3.5 mm. In accordance with the present disclosure, the hydraulic diameter of an opening is calculated with the formula 4 A/P, wherein A is the cross-sectional area of the opening and P is the perimeter of the same opening. The cross-sectional area of the opening can be determined by using basic measures (such as shape length and height) and a basic geometric formula (known from Euclidean geometry), if the shape of the opening is simple, e.g. a flat triangle, rectangle, quadrilateral, trapezoid or the like. Preferably, the area is determined on a plan view of the opening. Complex shapes can be approximated and subdivided in a number j=1, 2, 3 . . . m of simple shapes having an area $A_j$. The area of these shapes can again be calculated using basic measures and basic geometric formula. The area A of the opening is obtained by summing up all areas $A_j$ determined in the opening. The more complex the shape of the opening is, the more subdivisions are required. Preferably, the number m of individual simple shape sections j taken for the measurement is 1 to 1000, preferably 5 to 100, more preferably 5 to 20, such as 8 to 15.

The structured cross-channel packing elements of the structured packing bed of the present disclosure may be made by any process known for producing structured cross-channel packing elements with a conventional height by using metal strips with the required, reduced width. Alternatively, structured cross-channel packing elements with a conventional height may be cut/sawed into two or more parts, with at least one part having the required height.

In accordance with a further aspect, the present disclosure relates to a mass transfer and/or heat exchange column comprising at least one of structured packing bed described above.

The present disclosure is particularly suitable for mass transfer and/or heat exchange columns having a large cross-sectional area. Therefore, it is preferred that the mass transfer and/or heat exchange column according to the present disclosure has an at least essentially circular cross-sectional shape and that the inner diameter of the mass transfer and/or heat exchange column is at least 400 mm, preferably at least 600 mm, even more preferably at least 800 mm, yet more preferably at least 1 m, still more preferably at least 1.5 m, and most preferably at least 2 in. It is further preferred that the inner diameter of the mass transfer and/or heat exchange column is at most 15 m, more preferably at most 12 m, and even more preferably at most 6 m. Good results are for instance obtained when the inner diameter of the mass transfer and/or heat exchange column is 1.5 to 12 m or 1.5 to 6 m.

If the mass transfer and/or heat exchange column according to the present disclosure has a different cross-sectional shape than an at least essentially circular, such as a rectangular or oval cross-sectional shape, then it is preferred that the longest dimension of the cross-section of the mass transfer and/or heat exchange column is at least 1 m, preferably at least 1.5 m, and more preferably at least 2 m. It is further preferred that the longest dimension of the mass transfer and/or heat exchange column is at most 15 in, more preferably at most 12 in, and even more preferably at most 6 m. Good results are for instance obtained when the longest dimension of the mass transfer and/or heat exchange column is 1.5 to 12 m or 1.5 to 6 m.

Preferably, the mass transfer and/or heat exchange column comprises 1 to 6 and more preferably 1 to 3 structured packing beds.

In addition, it is preferred that the mass transfer and/or heat exchange column comprises a liquid distributor above each of the structured packing beds so as to allow at least an essentially homogeneous distribution of the heavy phase during the operation of the mass transfer and/or heat exchange column over the cross-section of the structured cross-channel packing element bed.

In accordance with a further preferred embodiment of the present disclosure, it is proposed that the mass transfer and/or heat exchange column comprises below the bottom of each structured packing bed a collector, which allows collection of the heavy phase trickling down the surfaces of the sheets of the structured cross-channel packing elements of the layers of the structured packing bed during the operation of the mass transfer and/or heat exchange column.

Most preferably, the mass transfer and/or heat exchange column of the present disclosure is a distillation column.

In accordance with still a further aspect, the present disclosure relates to a method for mass transfer and/or heat exchange, wherein at least two fluids are directed through a mass transfer and/or heat exchange column described above, wherein the mass transfer and/or heat exchange column is operated at a pressure of at least 6 bar.

Preferably, the mass transfer and/or heat exchange column is operated at a pressure of at least 6 bar, more preferably at least 8 bar, still more preferably at least 10 bar, yet more preferably at least 12 bar, and most preferably at least 15 bar.

Good results are in particular obtained, when the method is performed with a distillation column, i.e. that the method is a distillation. The two fluids are in this embodiment directed through the distillation column in counter-current flow, with the liquid flowing from the top to the bottom of the column and the gas raising up from the bottom to the top of the column.

More specifically, the method in accordance with the present disclosure is particularly suitable for separating by distillation light hydrocarbons, such as methane, ethane, propane, butane, ethylene or propylene, and particularly those found in petroleum sources and natural gas.

Thus, the mass transfer and/or heat exchange column in accordance with the present disclosure is particularly suitable for gas production plants that have distillation columns that separate light hydrocarbons, e.g. methane, ethane, propane, butane, ethylene or propylene, found in petroleum sources and natural gas or for petrochemical plants dealing with light hydrocarbons, especially superfractionators performing difficult separations between liquid hydrocarbons with similar boiling temperatures.

The invention will be explained in more detail hereinafter with reference to the drawings.

FIG. 2b is a schematic side view of the structured cross-channel packing element shown in FIG. 2a.

DETAILED DESCRIPTION

Figure 1:
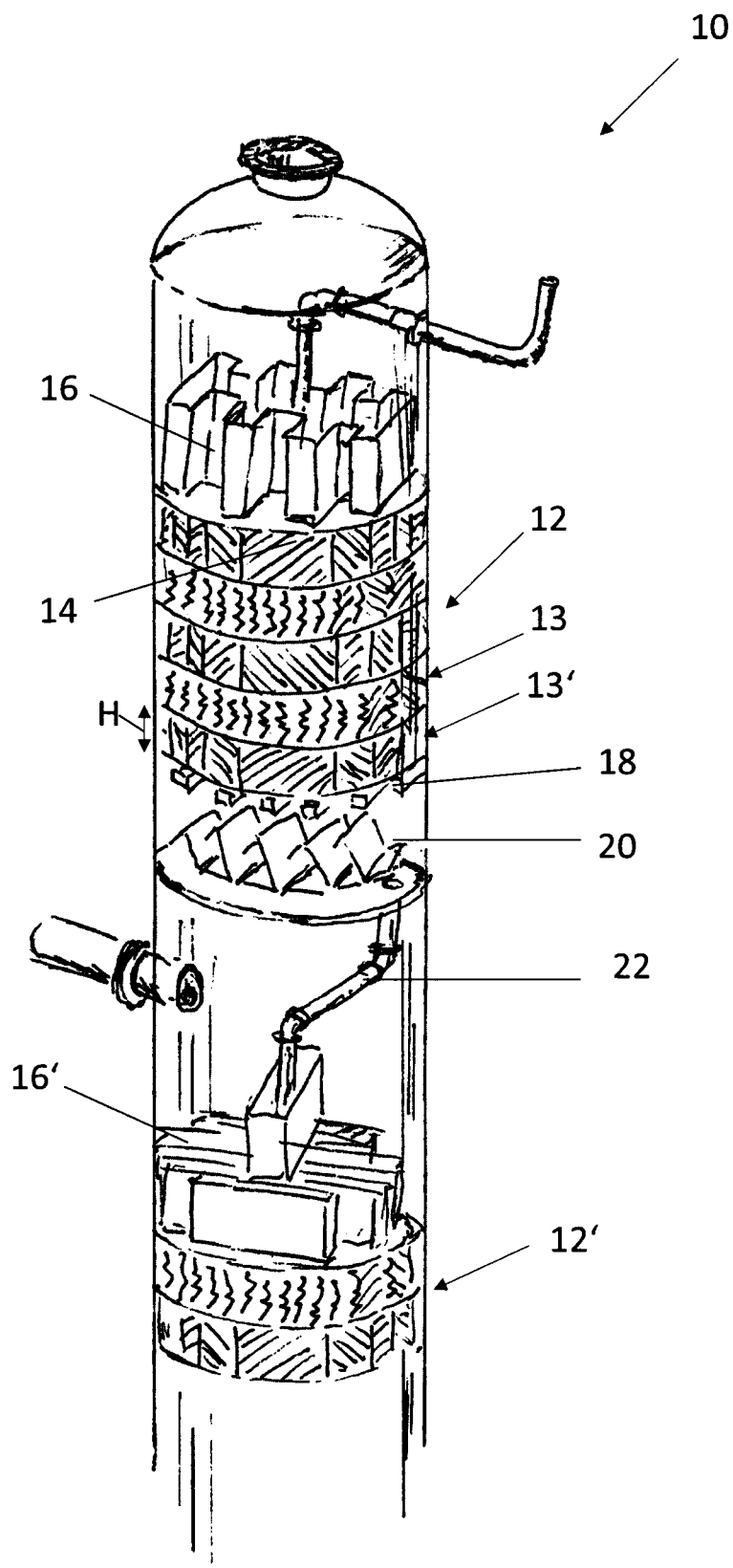
FIG. 1 is a schematic side view of a mass and/or heat exchange column including two structured packing beds with each comprising several layers of structured cross-channel packing elements according to one embodiment of the present disclosure.

FIG. 1 shows is a schematic side view of a mass transfer column 10 and more specifically a distillation column 10 according to one embodiment of the present disclosure (the transparent inside of the figure is only for illustrative purposes). The distillation column 10 comprises two structured packing bed beds 12, 12', wherein each of the structured packing bed beds 12, 12' comprises several layers 13, 13', with each of the layers 13, 13' comprising several structured cross-channel packing elements 14. Above each of the two beds 12, 12' a distributor 16, 16' is arranged to evenly distribute the liquid over the cross-section of the structured packing bed 12, 12', while leaving enough space for the vapor to ascend through it. Below each bed 12, 12' a grid-like holding device 18 and a collector 20 are arranged (not shown for bed 12'), wherein the grid-like holding device 18 keeps the bed 12 at its position and the collector 20 collects the liquid trickling down from the bed 12, while sufficient open space is left in the collector for the vapor to ascend.

All layers 13, 13' of both structured packing bed beds 12, 12' are composed exclusively of structured cross-channel packing elements 14, wherein each of the structured cross-channel packing elements 14 has the same height H and the same specific surface area. In order to achieve that the mass transfer column 10 has both, a high mass transfer efficiency even if operated at a pressure above 10 bar and a comparable low pressure drop, each of the structured cross-channel packing elements 14 has a height H of 50 to less than 150 mm and most preferably of 75 to 110 mm and a specific surface area of 60 to 500 m$^2$/m$^3$. This solution bases on the surprising finding that a mass transfer column 10 may be operated even at a high pressure of at least 6 bar and even at a high pressure of more than 10 bar or even more than 15 bar with a high mass transfer efficiency and a low pressure drop, if it contains one or more structured packing beds 12, 12', wherein the one or more structured packing beds 12, 12' are composed or at least mainly composed of structured cross-channel packing elements 14 having a specific surface area of 60 to 500 m$^2$/m$^3$ and a height H of 50 to less than 150 mm. It is considered by the inventors of the present patent application that by shortening the height H of the structured cross-channel packing elements 14, a backmixing and in particular axial backmixing of the two phases flowing through the mass transfer column 10 can be significantly reduced, even and in particular if the mass transfer column 10 is operated at a pressure of more than 10 bar. This is considered to be due to interrupting or shortening, respectively, the comparably long flow paths within the conventional structured cross-channel packing elements by reducing the height H of the cross-channel packing elements 14.

During the operation of the distillation column 10, gas ascends as light phase from the bottom to top, whereas liquid as heavy phase descends in counter-current from the top to the bottom of the distillation column 10. More specifically, the liquid is essentially homogenously distributed by the distributor 16 over the cross-section of the structured packing bed 12 and trickles down along the surfaces of the sheets of the structured cross-channel packing elements 14. Between the different sheets of the structured cross-channel packing elements 14 open spaces are provided, which are filled with the gas and provide a path for the gas to ascend, while it is driven by a pressure gradient. By allowing the liquid to spread on the surface of the sheets of the structured cross-channel packing elements 14, a large interface is created between the two phases so that an efficient heat and mass transfer between the liquid and the gas is established at the interface. At the bottom of the bed 12, the liquid is collected in the collector 20 and guided via the pipe 22 down to the distributor 16' above the second bed 12'.

Figure 2A:
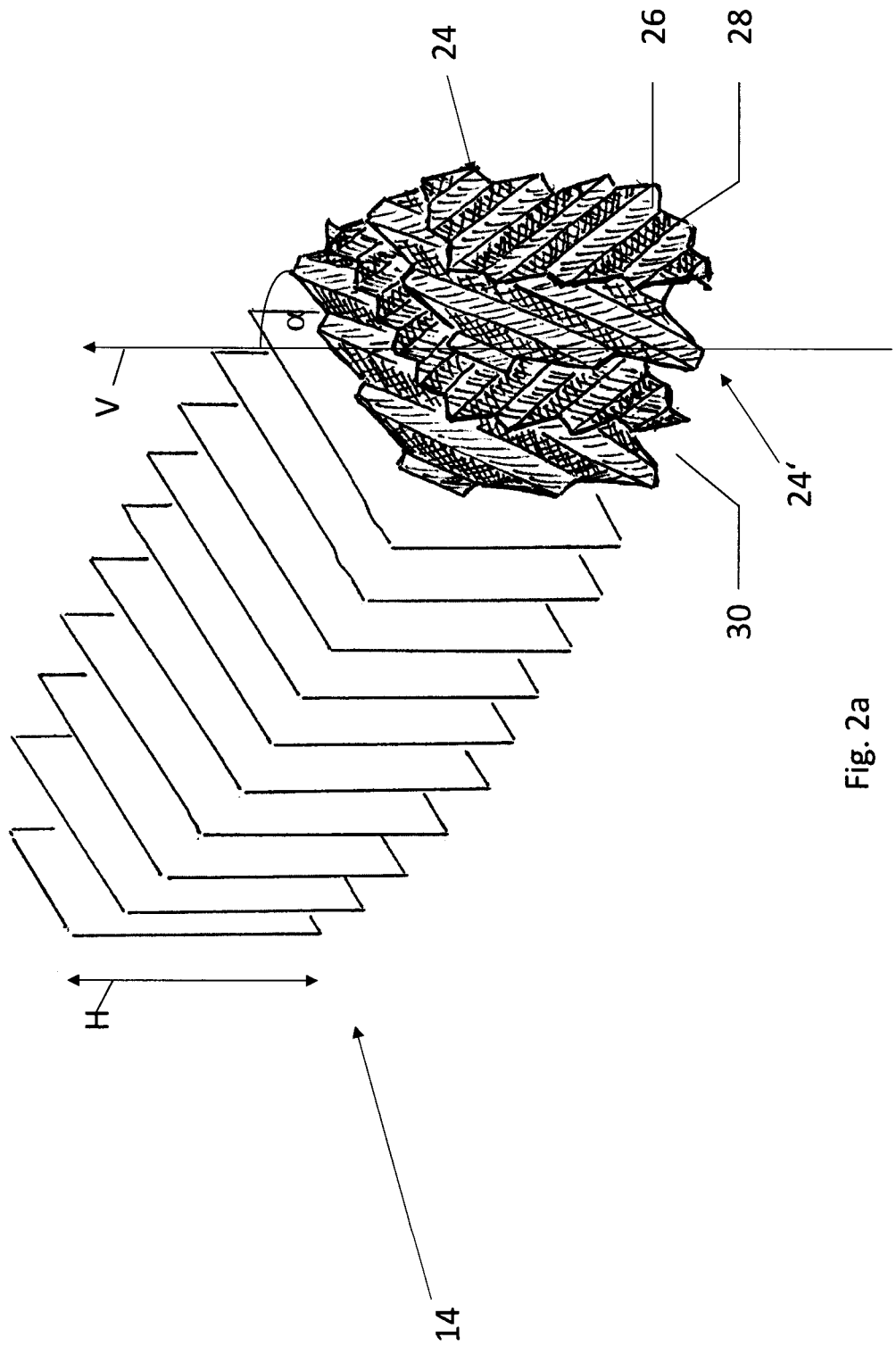
FIG. 2a is an explosion view of a part of the sheets of a structured cross-channel packing element used in a structured packing bed according to one embodiment of the present disclosure.
Figure 2B:
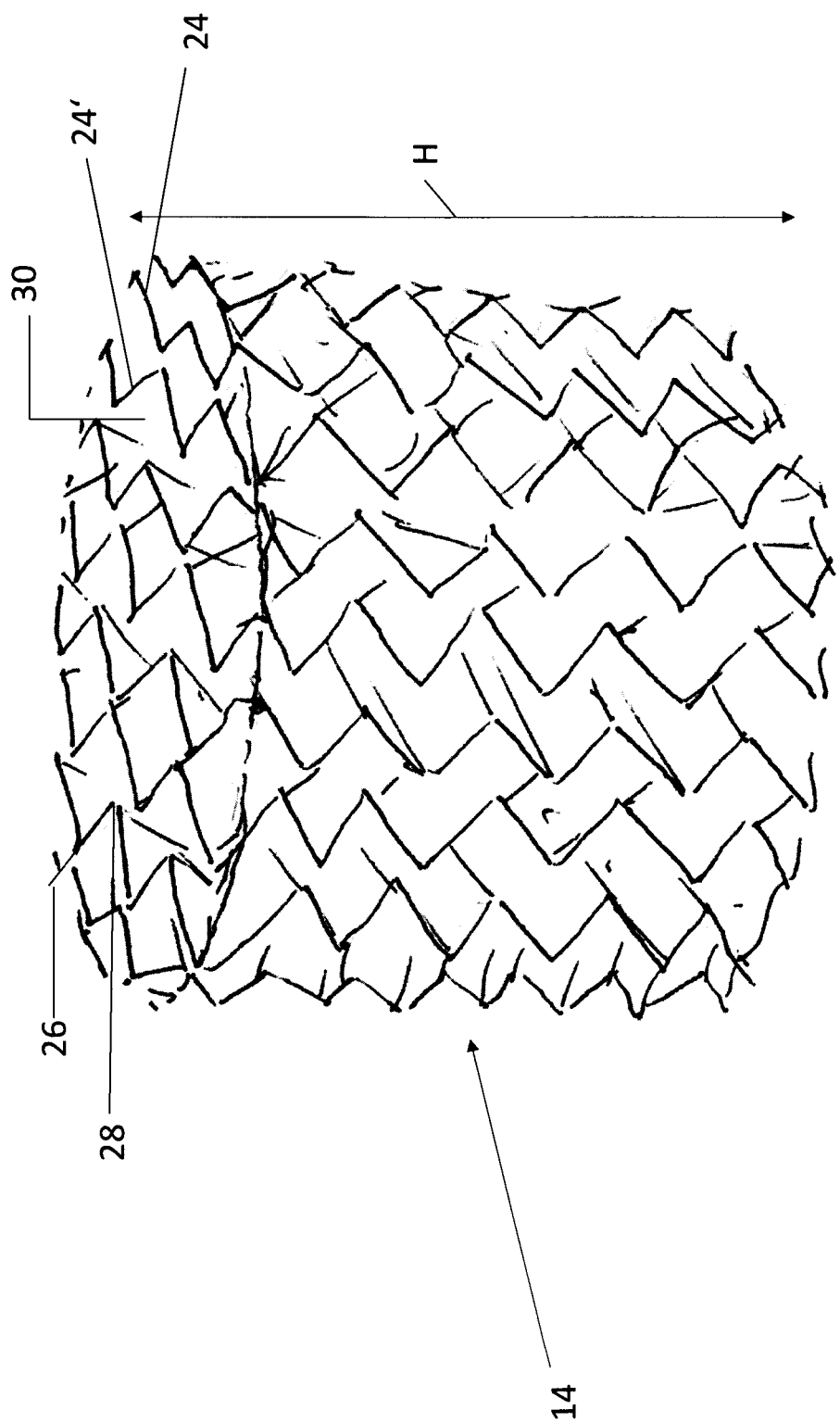

FIGS. 2a to 2b show a structured cross-channel packing element 14 to be used in a structured packing bed 12, 12' according to the present disclosure. The structured cross-channel packing element 14 is assembled from a plurality of corrugated sheets 24, 24', which are parallel and in touching contact with each other. The structured cross-channel packing element 14 has a height H of 50 to less than 150 mm and most preferably of 75 to 110 mm and a specific surface area of 60 to 500 m$^2$/m$^3$.

The corrugated metal sheets 24, 24' are fixed with each other, for example by means of several rods (not shown) penetrating the corrugated sheets 24, 24' perpendicular to the longitudinal section of the corrugated sheets 24, 24', wherein the rods are fixed with the first and last corrugated sheet by means of a washer and a nut or by bending the rods or by any other means (not shown). Each corrugated sheet 24, 24' comprises a plurality of alternately oriented peaks 26 and valleys 28, wherein adjacent corrugated sheets 24, 24' are oriented such that the corrugations 26, 28 of the adjacent corrugated sheets 24, 24' intersect in crisscross fashion with the corrugations 26, 28 of the corrugated sheets 24, 24' extending obliquely relative to the longitudinal direction V, thus forming inclined channels 30 which continuously cross one another. More specifically, the angle α between each of the peaks 26 and each of the valleys 28 with respect to the longitudinal direction V is 10° to 60°, preferably 20° to 50° and most preferably 25° to 47°, wherein the peaks 26 and valleys 28 of adjacent corrugated sheets 24, 24' are oriented in opposing directions. The channels 30 define a maximum distance between adjacent corrugated sheets 24, 24', such as for example of 20 mm. These channels 30 positively influence the flows of the gas phase and of the liquid phase within the structured cross-channel packing element 14 and facilitate the mass transfer between the phases. That is, the gas phase and liquid phase are brought into contact in the channels 30 of the structured cross-channel packing element 14 and the mass transfer as well as the heat transfer between the phases is thus facilitated. More specifically, ascending gas comes into contact with liquid, which is present on the surface of the corrugated sheets 24, 24' defining the channels 30, when it flows downwardly through the mass transfer column. All in all, the light phase flows through the open space or channels 30, respectively. This leads to a particularly efficient mass and energy transfer between the light and heavy phases. Moreover, the crisscross fashion of the channels 30 leads to an optimal distribution of the phases from left to right.

Figure 3:
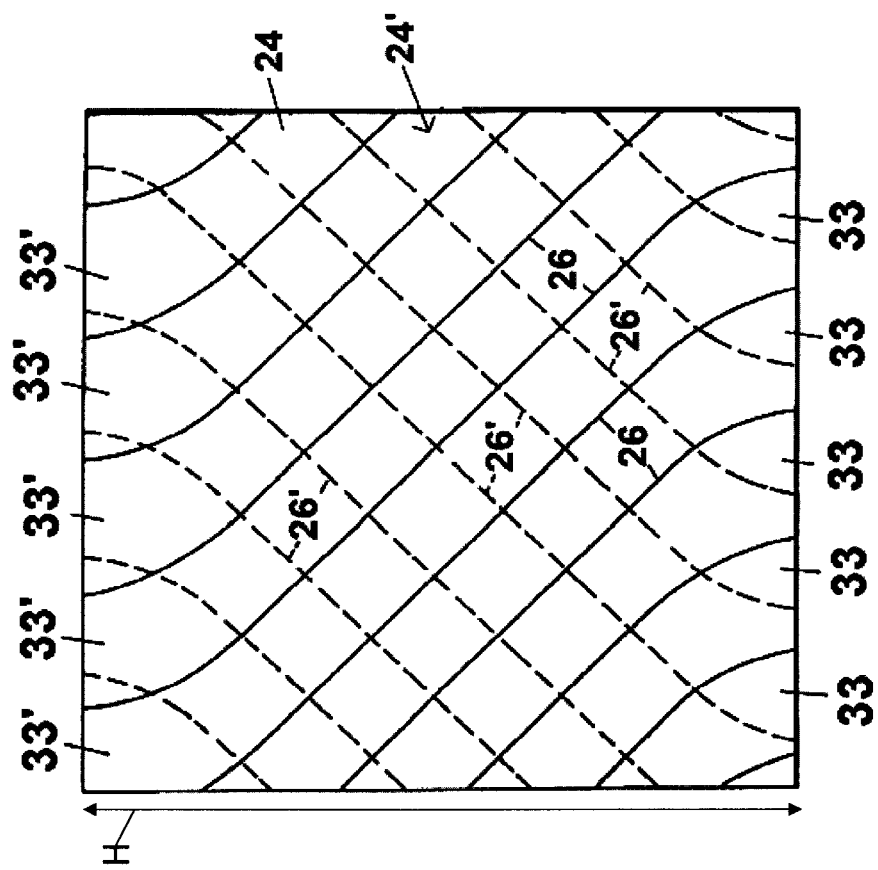
FIG. 3 is a fragmentary view of a structured cross-channel packing element used in a structured packing bed according to another embodiment of the present disclosure.

FIG. 3 shows a fragmentary view of a structured cross-channel packing element 14 to be used in a structured packing bed 12, 12' in accordance with an alternative embodiment of the present disclosure. The structured packing element 14 of FIG. 3 is similar to that shown in FIGS. 2a to 2b except that corrugated sheets 24, 24' do not comprise linear extending peaks and valleys, but rather the peaks 26, 26' and valleys of the corrugated sheets 24, 24' are bent in the terminal zones or portions 33, 33', respectively, so as to extend in the terminal zones 33, 33' of the corrugated sheets 24, 24' essentially in the vertical direction. The terminal zones are the uppermost and the lowermost zones 33, 33' of the corrugated sheets 24, 24' extending from the upper and lower edges of the corrugated sheets 24, 24' 30%, preferably 25%, and more preferably 20%, or less along the length of the corrugated sheets 24, 24', which is the direction along the longitudinal direction V of the corrugated sheets 24, 24'. Each of the terminal zones 33, 33' may have peaks 26, 26' and valleys with a different height than those of the central zone, which is the zone of the corrugates sheets 24, 24' between the two terminal zones 33, 33'. Such features as the different height or the bend may be present in both terminal zones 33, 33' of the corrugated sheets 24, 24' only. The structured cross-channel packing element has a height H of 50 to less than 150 mm and most preferably of 75 to 110 mm and a specific surface area of 60 to 500 $m^2/m^3$.

In FIG. 3, the solid lines depict the peaks 26 of the corrugations in the face of the corrugated sheet 24 presented to the viewer, while the broken lines 26' depict the peaks of the corrugations in the corresponding face of the corrugated sheet 24' immediately behind the one in view. By bending the terminal zones 33, 33' so as to extend in the terminal zones 33, 33' of the corrugated sheets 24, 24' essentially in the vertical direction, the flow resistance of the terminal zones 33, 33' of the corrugated sheets 24, 24' is reduced compared to the flow resistance of the zones being located between the terminal zones 33, 33' of the corrugated sheets 24, 24'. This leads to a reduced pressure loss of the structured packing element.

The invention claimed is:

1. A structured packing bed for a column for at least one of mass transfer and heat exchange between a first fluid phase and a second fluid phase, the structured packing bed comprising:
    at least two layers that are stacked vertically above each other,
    at least two of the at least two layers each comprising at least one structured cross-channel packing element having a specific surface area of 60 to 500 $m^2/m^3$ and a height of 50 to less than 150 mm,
    at least 50% of the at least one structured cross-channel packing element being a block,
    each block comprising a plurality of sheets with periodic deformations, the sheets being arranged in a longitudinal direction parallel and in touching contact with each other such that an open space extending from one end to an opposite end of the sheets is provided between them, the open space being defined by the periodic deformations,
    adjacent sheets being oriented such that the periodic deformations of the adjacent sheets intersect in crisscross fashion with each other, and
    at least one of the at least one structured cross-channel packing element of a layer being rotated with regard to at least one of the at least one structured cross-channel packing element of an adjacent layer by 70 to 110°.

2. The structured packing bed according to claim 1, wherein the height of the at least one structured cross-channel packing element is 50 to less than 150 mm.

3. The structured packing bed according to claim 1, wherein the specific surface area of the at least one structured cross-channel packing element is 60 to less than 500 $m^2/m^3$.

4. The structured packing bed according to claim 1, wherein:
    each of the at least two layers comprises one or more structured cross-channel packing elements, and
    all of the one or more structured cross-channel packing elements of a layer have an essentially same specific surface area such that each of the one or more structured cross-channel packing elements of the layer has a specific surface area of 80 to 120% of the average specific surface area of all of the one or more structured cross-channel packing elements of the layer.

5. The structured packing bed according to claim 1, wherein the structured packing bed comprises 2 to 30 layers.

6. The structured packing bed according to claim 1, wherein at least 50% of the at least two layers comprise at least one structured cross-channel packing element having a specific surface area of 60 to 500 $m^2/m^3$ and a height of 50 to less than 150 mm.

7. The structured packing bed according to claim 1, wherein at least 50% of the one or more structured cross-channel packing elements of the layer are rotated by 70 to 110° with regard to an adjacent structured cross-channel packing element of the adjacent layer of the structured packing bed.

8. The structured packing bed according to claim 1, wherein the structured packing bed has a circular cross-section and a diameter of the structured packing bed is at least 1 m.

9. The structured packing bed according to claim 1, wherein:
    at least 75% of the at least one structured cross-channel packing element is a block,
    each block comprises the plurality of sheets with periodic deformations, the sheets being arranged in the longitudinal direction parallel and in touching contact with each other such that the open space extending from one end to the opposite end of the sheets is provided between them, the open space being defined by the periodic deformations, and
    adjacent sheets are oriented such that the periodic deformations of the adjacent sheets intersect in crisscross fashion with each other.

10. The structured packing bed according to claim 9, wherein:
    the periodic deformations are corrugations comprising a plurality of alternately oriented peaks and valleys,
    the peaks of one of the plurality of sheets contact the valleys of an adjacent one of the plurality of sheets, and the valleys of one of the plurality of sheets contact the peaks of an adjacent one of the plurality of sheets, and
    adjacent sheets of the plurality of sheets are oriented such that the peaks and valleys of the adjacent sheets intersect in crisscross fashion with the peaks and valleys of the ones of the plurality of sheets extending obliquely relative to the longitudinal direction.

11. The structured packing bed according to claim 10, wherein:
    an angle α between each of the peaks and each of the valleys with respect to the longitudinal direction is 10° to 60°, and
    the peaks and the valleys of the adjacent sheets, respectively, are oriented in opposing directions.

12. The structured packing bed according to claim 10, wherein:
  the peaks and the valleys of the plurality of sheets are bent in at least one terminal zone so as to extend in the at least one terminal zone of the plurality of sheets essentially in the longitudinal direction such that a terminal angle between the peaks or the valleys with the longitudinal direction is less than the angle $\alpha$, and
  the at least one terminal zone is at least one of an uppermost zone and a lowermost zone of the plurality of sheets extending from an upper edge and a lower edge of the plurality of sheets 30% or less along a length of the plurality of sheets.

13. A column for at least one of mass transfer and heat exchange, the column comprising at least one structured packing bed according to claim 1.

14. The column according to claim 13, wherein the column has a circular cross-section and an inner diameter of the column is at least 1 m.

15. A method comprising:
  performing at least one of mass transfer and heat exchange by directing at least two fluids through the column according to claim 13, and operating the column at a pressure of at least 6 bar.

* * * * *